United States Patent [19]
Wheelen, III et al.

[11] 3,760,055
[45] Sept. 18, 1973

[54] PROCESS FOR REUSING THERMOPLASTIC MATRICES

[75] Inventors: John B. Wheelen, III, Somerville; John Sonia, Califon; Thomas E. Hayes, Highland Park; Robert P. Petrochko, Somerville, all of N.J.

[73] Assignee: Union Carbide Corporation, New York, N.Y.

[22] Filed: Aug. 19, 1969

[21] Appl. No.: 851,490

[52] U.S. Cl. .............................. 264/220, 264/219
[51] Int. Cl. .............................................. B29d 7/22
[58] Field of Search ........................... 264/219, 220

[56] References Cited
UNITED STATES PATENTS

| | | | |
|---|---|---|---|
| 1,960,602 | 5/1934 | Swan | 264/220 X |
| 2,482,981 | 9/1949 | Kamrass | 156/220 |
| 2,914,109 | 11/1959 | Hsu | 264/293 X |
| 3,380,878 | 4/1968 | Wheeler | 264/226 X |

Primary Examiner—Robert F. White
Assistant Examiner—Richard R. Kucia
Attorney—Paul A. Rose, Gerald R. O'Brien, Jr. and John E. Lynch

[57] ABSTRACT

The process for forming at least two matrices from a thermoplastic matrix and a thermoplastic overlay sheet by contacting a thermoplastic matrix blank with a first pattern and applying heat and pressure to make a first matrix; placing the overlay sheet in contact with the first matrix and a second pattern; applying heat and pressure to the overlay sheet and first matrix in contact with the second pattern to form a second matrix.

14 Claims, No Drawings

PROCESS FOR REUSING THERMOPLASTIC MATRICES

BACKGROUND

This invention relates to a process for forming at least two matrices from a thermoplastic matrix blank. More particularly this invention relates to a process for reusing thermoplastic matrices by the use of thermoplastic overlay sheets.

As described in U.S. application Ser. No. 365,797, the use of a polyarylene polyether matrix has been found most advantageous in such applications as the molding of printing plates, sound records and the like. These matrices are characterized by uniform mold shrinkage in all directions and thermal and dimensional stability at molding temperatures of up to 350°F.

Also described in Ser. No. 365,797 is a process for reforming the matrix from a used matrix wherein the back of a used matrix is contacted with an original to form a new matrix. In this process the molded side of the matrix is completely obliterated and becomes the back of the new matrix.

It has been found that when employing this process for reusing matrices, it is most desirable that all matrices have the same floor thickness and depth of penetration. This creates certain difficulties when the image area in the face of the matrix may vary from 10 per cent to 90 per cent of the total surface depending upon the image area of the original form. When an original with a large image area is molded into a matrix blank, a large volume of material must be displaced. This displaced material becomes flash and is trimmed off to make the matrix fit the plate mold and consequently is eliminated from the material which is available in making successive matrix blanks from the used matrix. Thus, it is evident that if an original with a smaller image area is molded into a used matrix with a larger image area, insufficient material is available to fill the non-image volumes completely since the depth of penetration into the matrix blank is to be held constant. If one assumes a random sequence of large or small image areas to be molded in production, the probability of a smaller following of large image is approximately 50 per cent. Therefore, in 50 per cent of the matrices, it is necessary to add more material when remolding a used matrix in order to avoid insufficient non-image fill when maintaining the same floor thickness.

SUMMARY

The process of the present invention for forming at least two matrices from a thermoplastic matrix blank and a thermoplastic overlay sheet comprises contacting the matrix blank with a first pattern, applying heat and pressure to the blank, thereby forming a first matrix; placing the overlay sheet in contact with the first matrix, and a second pattern; applying heat and pressure to the first matrix and overlay sheet in contact with the second pattern thereby forming a second matrix whereby the overlay sheet becomes an integral part of the second matrix and the negative of the first pattern is obliterated.

DESCRIPTION

Thermoplastic materials that can be used in this invention include polyarylene polyethers, polypropylene, acrylonitrile-butadiene-styrene (ABS) copolymers, polyhydroxyether, impact polystyrene, styrene-acrylonitrile copolymers, polycarbonates, poly-4-methylpentene-1, phenoxys, polyoxymethylenes, polymethacrylates, and the like.

The preferred class of thermoplastic polymers comprises those with a high degree of rigidity and little or no crystallinity, in which the softening temperature and the glass transition temperature coincide. These polymers are known as amorphous and include polyarylene ethers, polycarbonates, polystyrenes, polymethacrylates, polyhydroxy ethers, and the like.

Polyarylene polyethers useful in the present invention are linear thermoplastic polymers having a basic structure composed of recurring units having the formula:

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through the aromatic carbon atoms. The foregoing polyarylene polyethers and their preparation are described in detail in U.S. Pat. No. 3,380,878.

Other thermoplastic polyarylene polyethers are composed of recurring units having the formula:

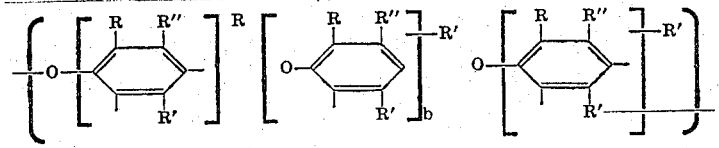

wherein the free valence of the terminal oxygen atom of one unit is connected to the free valence of the terminal benzene nucleus of the adjoining unit, $b$ is an integer of from 0 to 1, inclusive, R is a monovalent substituent selected from the group of hydrocarbon radicals, halohydrocarbon radicals having at least two carbon atoms, R' and R'' are the same as R and in addition hydrogen, said matrix exhibiting uniform mold shrinkage in all directions of 0.7 per cent and less, and characterized by being thermally and dimensionally stable at molding temperatures of up to 350°F. The foregoing polyarylene polyethers and their preparations are described in U.S. Pat. No. 3,314,753.

Polyhydroxyethers are substantially linear polymers having the formula:

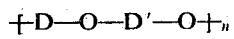

wherein D is the radical residuum of a dihydric phenol, D' is a hydroxyl containing radical residuum of an epoxide and n represents the degree of polymerization and is at least 30 and is preferably 80 or more.

Thermoplastic polyhydroxyethers and their preparation are described in U.S. Pat. No. 3,245,865.

Suitable polycarbonates having recurring structural units of the formula:

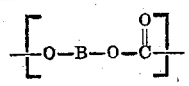

wherein B is a divalent aromatic radical of a dihydric phenol.

Thermoplastic materials useful in the present invention are crystalline polymers. Examples of such crystalline polymers are poly-4-methylpentene-1, polyoxymethylenes, polypropylenes and the like.

By way of explanation, it must be understood that the scope of the present invention is not limited to the materials disclosed herein and that most thermoplastic materials can be used as matrices with the proviso that printing plates, sound records, and the like can be molded against such material.

It must be further understood that the scope of the present invention is not limited to matrix blanks and overlay sheets of the same composition. For example, an overlay sheet of 5 per cent polysulfone/polysiloxane ABA copolymer dispersed in polysulfone can be employed with an original sheet of polysulfone.

The matrix of the present invention is generally formed by contacting a sheet or composite sheet of thermoplastic described herein with an original plate or pattern, applying heat and pressure, separating the matrix and original and allowing the matrix to cool. In this manner, excellent reproduction of the original is obtained in the matrix against which true duplicates of the original can be molded as described infra.

The temperature at which a matrix can be formed is not narrowly critical. Obviously, the lowest temperature will be the temperature at which the polymer can be formed under pressure, and the highest temperature will be below the decomposition temperature of the polymer of softening point of the original. Temperatures ranging from 415° to 750°F., preferably 425° to 650°F. meet these practical criteria for the thermoplastic polyarylene polyether. Matrices can be formed from unmounted copper originals at temperatures of 415° to 550°F., from zinc and magnesium originals at temperatures of 425° to 475°F. and from type metal, such a Linotype metal which softens under pressure at about 440°F., at temperatures of 425° to 435°F. by conventional compression molding procedures.

The thermoplastic matrices can be formed by conventional compression molding techniques in which the press platen temperatures do not exceed the limits specified above for the various materials in the original form. However, conventional compression molding is relatively slow and does not take advantage of the rapid molding capabilities of a thermoplastic material which only needs to be fluxed, formed and cooled, and does not require the cure time of the conventional thermosetting matrices.

It is evident that, since the plastic matrix material is a thermal insulator, heat transmission through it from the heated platen may be sufficiently delayed for short periods of time, e.g., 20 to 150 seconds, that a relatively steep temperature gradient is induced from the back of the matrix against the heated platen to the face against the type metal. Thus the heated platen can be at any temperature up to about 750°F., but the interface will still not exceed the softening temperature of the type metal at the face of the matrix if the heating time under light pressure in the molding press is not excessively long. The matrix and original are then quickly cooled, by transferring from the heated press to a cold press and cooling under high pressure for periods of from 15 to 30 seconds. Thus, very short molding cycles, compared to customary thermoset matrix materials are possible, using the thermoplastic polyarylene polyethers.

Molding pressure can vary widely. Useful pressures range from 50 psi to 2,000 psi, preferably from 200 to 1,000 psi.

Specific examples of suitable techniques for forming a matrix of the present invention are detailed in Examples 1-3 below.

A suitable process for forming a first matrix encompasses heating a thermoplastic blank, which has been previously dried at 250°-300°F. for four hours to remove entrained moisture, to a predetermined temperature so that it becomes formable and adheres to a spatula, inverting blank and spatula in a preferred embodiment, contacting the blank with an original plate or pattern, applying pressure to form the blank into an article such as a matrix, cooling the thus formed article, separating the article from the pattern, and allowing the article to further cool.

Although the blank can be formed of pellets spread evenly on a spatula and melted to form a molten sheet, preferably the blank is placed on the spatula in the form of an existing sheet.

Another suitable method for forming a first matrix encompasses placing a sheet on an original form and placing the combination in a mold press, inserting a hot plate and closing in the press with sufficient pressure to form the matrix. This process is described in detail in U.S. patent application Ser. No. 799,942 filed Feb. 17, 1969.

Sheets suitable as blanks in the process of the present invention can be fabricated by any known thermoplastic forming technique such as extruding, compression molding, injection molding, solution casting and the like. The thickness of sheets employed is not critical but is rather governed by practical considerations such as cost and ease of forming. In general, the most useful range of thickness for thermoplastic sheets is from about 0.015 inch to about 0.250 inch while the range of from about 0.070 inch to about 0.125 inch is preferred.

The matrix resin formulation can contain well-known additives such as fillers, dyes, pigments, stabilizers, lubricants, antioxidants, and impact modifiers, subject to the limitations that they must be stable at the melt processing temperatures of the thermoplastic. Normally, a dark-colored dye or pigment is added to the matrix material to make the image areas more visible for inspection. Such dyes include alizarin cyanine green or oil violet in concentrations of 0.03 to 0.1 per cent. Concentrations of 0.5% to 4.0% by weight of carbon black are also effective.

Of particular advantage as an additive to increase notched impact strength is a low molecular weight A-B-A block copolymer, comprising a B block of approximately 5,000 molecular weight polysiloxane polymer joined to two A blocks of approximately 5,000 molecular weight polyarylene polyether. The modifier is present in amounts by weight ranging from 3% to about 30% with the preferred concentrations being about 5%. This concentration of the impact modifier raises the notched Izod impact (ASTM D256-56) from 1.5 ft./lbs. per inch notch for plain polyarylene polyether to 16 to 18 ft./lb. As a result the matrix may be handled more rigorously in stripping from the original and in trimming. In addition, lower molecular weight resin may be used—0.35 to 0.4 reduced viscosity (instead of 0.5 required with plain polyarylene polyethers to obtain adequate toughness), which permits easier melt processing due to lower melt viscosity and/or lower processing temperatures in forming the matrix.

Polymeric material which can be molded against the matrix of the present invention to produce printing plates and the like can be either a thermoplastic, thermosetting, natural or synthetic polymeric material. In general, any normally solid polymeric material which is capable of being compression molded or cured by the application of pressure and heat up to about 350°F. can be molded against the matrix of the present invention.

Suitable thermoplastic materials include natural and synthetic rubbers, polyolefins such as polyethylene and polypropylene, polyvinylidene chloride, polyvinyls, polystyrene, polyethers, polyacrylates, polymethacrylates, polyamides, polycarbonates, polyhydroxyethers, polyoxymethylenes, copolymers and mixtures thereof, and the like.

Suitable thermosetting resins include phenolaldehyde polymers, urea-aldehyde polymers, melamine-aldehyde polymers, epoxy resins, polyesters, copolymers and mixtures thereof, and the like.

Polymeric materials moldable against the matrix of the present invention can contain any well known additive such as fillers, dyes, pigments, cross-linking agents, curing agents, stabilizers, plasticizers, preservatives, lubricants, antioxidants, and the like. However, polymeric molding formulations should not contain solvents or other materials which attack the thermoplastic polyarylene polyether matrix. Aromatic, ketone, ester and chlorinated solvents fall into this class and their use should be avoided, as should glycols and hydraulic oils when the matrix is hot. In general, any component which is inert with respect to the matrix and the polymer molded against the matrix can be included in a molding formulation.

In general, the matrix of the present invention separates readily from an original or duplicate member without the aid of a mold release agent. However, if desired, mold release agents can be used to effect separation between the matrix and original or duplicate member. The use of release agents has been found to be desirable when molding duplicate members from cross-linked polymeric materials such as epoxy resins and rubbers. Suitable mold release agents are graphite, molybdenum disulfide, silicone oils, and the like. The use of solvents or agents which attack the matrix material should be avoided.

The process of the present invention for reusing thermoplastic matrices encompasses adding an overlay sheet of the same plastic to a used matrix. As a practical matter, the overlay sheet should be thinner than the original blank. For example, if the original blank was 0.080 inch thick and the relief depth was 0.030 inch in the first matrix, then the overlay sheet of between 0.015 inch and 0.030 inch thickness is added. More than one overlay sheet may be added if necessary. It has been found that the overlay sheet can be efficiently added by the previous described process for making the first matrix without the risk of trapping air or forming bubbles. the overlay sheet is placed against the preheated spatula and the first matrix placed, image side up or down, but preferably down, against the overlay sheet and pressed onto it for abour 10–45 seconds to make both the overlay sheet and matrix adhere to the spatula. Thus, the overlay sheet becomes an integral part of the new blank which can be subsequently reused by contacting the blank with an original plate or pattern, applying pressure to form the blank into a matrix, cooling the matrix, separating the matrix from the pattern and allowing the matrix to further cool. Alternatively, the matrix may be placed against the spatula image side up or down and the overlay placed over it.

When reusing the matrix by conventional compression molding, the overlay sheet is placed between the used matrix, which is either face up or face down on the original or form, and the heated top platen of the molding press. Upon heating, the overlay sheet is fused into the used matrix and the trapped air expelled as the plastic flows out during the molding. The possible number of reuses is limited only by thermal degradation of the polyarylene polyether, or by contamination from dirt and dust in the molding area, or by inclusion of occasional small air bubbles. Alternatively, the overlay sheet can be placed directly on the original or form so that a new surface is used to emboss the detail on each successive matrix, and then the previous matrix placed thereon, preferably with the image side down on top of the overlay sheet.

The temperature and pressure requirements for the process of reusing the blank are the same as previously described for making the first matrix.

In this process as described, numerous overlay sheets can be employed against the same blank thereby reducing the unit cost of each molded matrix. Furthermore, the floor depth of the subsequent blanks remains the same after repeated use, regardless of the image areas of the original patterns or plates used. Each and every reuse of the blank results in a matrix which is an excellent reproduction of the original pattern against which true duplicates of the original can be molded.

The following examples are illustrative of the present invention and are not intended to limit the same. All parts and percentages are by weight unless otherwise indicated.

EXAMPLE 1

FORMING A MATRIX AND MOLDING AGAINST THE SAME

Thermoplastic polyarylene polyether pellets having a reduced viscosity of 0.47 were vacuum stripped for 72 hours at 120°C. The pellets were then compression molded at 500°F. in an electrically-heated hydraulic press into a plaque measuring 8 inches × 8 inches × one-eighth inch. The plaque was then contacted with a copper original relief printing plate coated with a silicone mold release oil and placed in an electrically-heated hydraulic press having a 4 inch ram. The plaque and original were preheated at 470°F. for 1½ minutes at zero pressure with the press platens closed. The thermoplastic matrix was then formed by applying 500 psi for one minute. The temperature was reduced to 200°F. and the original and matrix removed and cooled to room temperature. The resultant matrix was flat and had perfect reproduction of detail including small dots in the 150 lines per inch screens. The matrix was measured and was found to have uniformly shrunk in all directions 0.5 per cent from the copper original.

The matrix was trimmed to 8 × 8 inches to remove the volume of material, flashed from the image zones and then shaved on the image side, using a Premier Shaver, to adjust the image relief to 0.030 inch depth.

An intimate mixture of polyhydroxyether of the structure

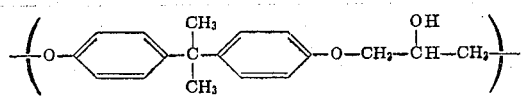

and 5 per cent by weight of rubber comprised of 95 per cent butadiene and 5 per cent styrene was molded against the matrices formed using the press described above. In each instance, the matrix and polymer mixture in contact therewith were preheated at 300°F. for three minutes under zero pressure with the press platens closed. Duplicate printing plates were then molded at 935 psi for 30 seconds. In each instance an excellent duplicate plate was obtained without any thermal or dimensional degradation of the matrix. The first matrix formed was used to mold seven duplicate plates as described previously. All of the duplicate plates obtained were equally excellent, there being no difference in quality of reproduction between the first and the last plate. The matrix showed no thermal or dimensional degradation after molding of the seven plates.

A piece of extruded film of the same polyarylene polyether, having a thickness of 0.020 inch was cut into an 8×8 inch square. The first matrix was then remolded against a second pattern whose image area and hence the displaced volume was less than that of the first pattern. The overlay sheet was placed upon the second pattern and the first matrix placed over it face down. The molding procedure was the same as for the first matrix. The resulting second matrix was equally as good as in reproduction quality as the first matrix and there were no entrapped air bubbles or evidence of degradation. This procedure was repeated eight more times in succession adding a new overlay sheet each time. In some cases the image areas on succeeding matrices were larger than on the preceding ones, but in each case the nonimage zones were filled out satisfactorily. Thus the original blank was re-used nine times.

EXAMPLE 2

Employing the process of the invention, a matrix was made as follows:

A 0.065 inch thick zinc original plate approximately 10 inches by 15 inches comprising 65 and 100 line halftone screens as well as line copy was placed on a 0.873 inch high bedplate in a molding press, which was required to bring the original pattern plate to suitable molding height for the press employed. Bearers were adjusted to provide a floor thickness of 0.060 inch in the matrix and to allow for the 0.261 inch thick spatula, making a total bearer height of 1.259 inches. The top press platen was set for about 100°F. and the bottom platen with the zinc plate on it for 325°F. The bed plate had a row of holes drilled in it along each edge to receive 11 springs on each side. These springs each with a compression strength of 60 lbs. per 1/8 inch compression, extended about one-fourth inch above the bed plate so as to support the marginal edges of the spatula high enough to prevent the matrix blank adhering thereto from touching the form until the press closed and to assist in separating the matrix from the original when the press opened. Total press clearance was 2-⅞ inches but actual closing distance 1-⅝ inches because of bed plate, original and spatula.

The 24 by 18 by one-fourth inches black oxidized stainless steel spatula was placed in oven under 1,100°F. nichrome wire tubes and heated for 6 minutes to bring it up to about 500°F. A matrix blank of polyarylene polyether 14 by 18 by 0.080 inches in size which had been previously dried to remove entrained moisture for 3 hours at 300°F. was laid on the spatula. A hold-down, formed of several closely spaced parallel bars, was then positioned over the spatula and the spatula, blank and hold-down advanced into the oven by pressing the starting control. After 30 seconds of heating the hold-down was withdrawn after the matrix blank had relaxed and adhered to the spatula.

After an additional 45 seconds (or 75 seconds total time) in the oven the sheet temperature was about 650°F., and the spatula and melted matrix blank were moved into the transfer and inverting zone. The spatula was inverted, inserted into the press and deposited on the bed plate springs. The press was then closed at a rate of 0.4 inch/sec. which required 4 seconds. The press then built up to a pressure of 1,200 psi on the work in two seconds. The automatic timer opened the press after 20 sec. under pressure with the matrix completely molded and solidified.

The matrix was then stripped from the original zinc plate and trimmed at the edges before being used to make a printing plate form. The polyarylene polyether matrix was an excellent negative replica of the original pattern plate in every respect. It retained the full depth of the etching especially in the highlight and shadow areas of the halftones. The matrix lay very flat with no warping.

The matrix was then trimmed to 10 × 15 wishes to remove the flash displaced from the image zone and shaved on the face to produce a uniform relief of 0.030 inch.

To make a printing plate polypropylene was extruded from an extruder having a 2 inch diameter orifice to a dispenser chamber by way of a ¾ inch heated connecting pipe 4 feet long. The chamber was 3-½ inches by three-fourth inch by 12 inches high when the ram mounted therein was raised to the beginning of its stroke. The ram was adapted to move in closure clearance with the chamber walls until the leading portion thereof passed through the outlet valve and emerged from the chamber. The temperature in the extruder barrel was 500°F., in the connecting pipe 400°F., the dispenser chamber was maintained at 475°F. and at the outlet valve of the dispenser the temperature was 400°F. Enough polypropylene to nearly fill the dispenser chamber was delivered thereto from the extruder in 60 seconds, the outlet valve being closed. The valve, which has an orifice of 3-½ inches by three-fourths inch, was opened and, pushed by the ram, the dispenser contents were discharged therefrom as a plastic wad onto a matrix mold, moving below toward a press. The wad, which was about 4 by 10 inches and weighed about 517 grams, was dispensed to the mold in about 5 seconds.

The mold was inserted into the press and the press closed for 1 minute 45 seconds, forming a printing plate 17 by 22-¾ inches and 0.060 to 0.090 inch thick. The plate was trimmed to remove flash and shaved to a thickness of 0.060 inch in the image areas. The plate was a very accurate reproduction of the matrix.

After molding the printing plate, the first matrix was employed to make a second matrix by the same process, employing another 0.065 inch thick engraving, having a different image configuration. A 0.016 inch thick sheet of the same polyarylene polyether was placed on the heated spatula, the first matrix placed face down on top of it, moved into the heating zone and adhered to be spatula. The second matrix was then molded in the same manner as the first and was perfectly formed, having no entrapped air bubbles, no residual image from the first matrix, with the overlay sheet perfectly fused in with the re-used matrix, In this same fashion eight additional matrices were formed in succession, each one being molded from the one preceding it, starting from the original blank by adding only a 0.016 inch thick overlay sheet each time to make up for the material which had been flushed out. The last matrix was as good as the first.

EXAMPLE 3

Thermoplastic polyarylene polyether pellets having a reduced viscosity of 0.5, were compounded with dispersed per cent by weight of a block copolymer, in which one block consisted of an approximately 5,000 molecular weight polydimethylsiloxane polymers, is reacted to form the copolymer with blocks consisting of approximately 5,000 molecular weight polyarylene polyether, having the repeating unit as the polymer in Example 1, by passing through a twin screw compounding extruder. The block copolymer was dispersed throughout 0.5 reduced viscosity polyarylene polyether. Average particle size of the copolymer was about one micron, and it was evenly ispersed throughout. Notched Izod impact values for this material was about 16 ft./lbs. per ⅛ in. notch. the compound was then extruded into 0.080 inch thick sheets of matrix blank and 0.019 inch thick overlay sheets, cut to 24 ¼ inches by 16 7.16 inches. These sheets were oven-dried for four hours at 125°C., to drive off any entrained moisture.

A typeform, consisting of two tabloid sized newspaper pages was heated on an electrically heated steel plate to 325°F. A first matrix was formed from this pattern by placing an 0.080 inch thick extruded sheet of the copolymer on it, covering it with a sheet of 0.005 inch thick glass cloth having a Teflon coating on the side in contact with the plastic matrix blank.

The form with the matrix blank and the release sheet on it was placed in a hydraulic press having a lower platen at 325°F. and a retractable upper platen at 700°F. The press was closed to exert a contact pressure of 5 psi. for 20 seconds to soften the plastic matrix blank. The pressure was then increased to 200 psi for 75 seconds to mold the image detail into the matrix and to level the back to a uniform floor of 0.050 inch thick in the image areas. The press was then opened, the heated upper platen withdrawn and a 3 ¼ inches thick steel plate at a temperature of 80°F. inserted in place of it. The press was closed with a pressure of 500 psi for 20 seconds to cool and solidify the matrix, after which the press was opened, the form and matrix withdrawn, and the matrix stripped from the form. This matrix was a perfect replica of the typeform.

The matrix was then trimmed to 24 ¼ × 16 7/16 inches to remove the material flashed out from the image and then shaved on the image side, using a Premier Shaver, to 0.080 inches thick to give a uniform relief of 0.030 inches. Polypropylene printing plates were molded from this matrix as in Example 2.

After the plates were molded from this matrix it wa again dried in an oven for four hours at 250°F. Another type-form like the first was heated as previously described. A 0.020 inch thick sheet of the impact modified polyarylene polyether was laid on the form and the first matrix placed face down on top of it, and a second matrix was then molded in the same manner as the first. The second matrix was an excellent reproduction of its pattern and had no entrapped air bubbles. The image from the first matrix was entirely obliterated.

This same procedure was then used to mold thirteen more matrices, each one being made in succession by remolding it from the previous one, adding only the overlay sheets each time to make up for displaced image material which had been flushed out and trimmed off. The last matrix showed no sign of degradation or air bubbles and had the same reproduction quality as the first one.

What is claimed is:

1. A process for forming at least two matrices from a thermoplastic matrix blank and a thermoplastic overlay sheet which comprises:
   a. contacting said blank with a first pattern, applying sufficient heat and pressure to said blank to form a first matrix;
   b. placing said overlay sheet in contact with said first matrix and a second pattern;
   c. applying sufficient heat and pressure to said first matrix and overlay in contact with said second pattern to form a second matrix whereby said overlay sheet become an integral part of said second matrix and the negative of the first pattern is obliterated.

2. The process of claim 1 wherein:
   a. the overlay sheet is placed in contact with the first matrix;
   b. sufficient heat and pressure are applied to said first matrix and overlay sheet to form a second matrix blank, whereby said overlay sheet becomes an integral part of said second matrix blank and the negative of the first pattern is obliterated; and
   c. contacting the second matrix blank with a pattern, applying sufficient heat and pressure to the second blank to form a second matrix.

3. The process of claim 1 wherein two or more overlay sheets are used.

4. The process of claim 1 wherein the overlay sheet is placed in contact with the molded side of said matrix.

5. The process of claim 1 wherein the overlay sheet is placed in contact with the back side of said matrix.

6. The process of claim 1 wherein the overlay sheet is placed against said first pattern and said matrix placed over said overlay sheet.

7. The process of claim 1 wherein said matrix blank used ranges in thickness of from 30 mils to 250 mils.

8. The process of claim 1 wherein said overlay sheet ranges in thickness of from 15 to 30 mils.

9. The process of claim 1 wherein a thermoplastic employed is a polyarylene polyether composed of recurring units having the formula:

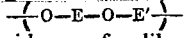

wherein E is the residuum of a dihydric phenol and E' is the residuum of a benzenoid compound having an inert electron withdrawing group in at least one of the positions ortho or para to the valence bonds, and where both of said residua are valently bonded to the ether oxygen through aromatic carbon atoms.

10. The thermoplastic defined in claim 9 wherein said polyarylene polyether is composed of recurring units having the formula:

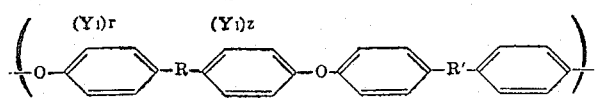

wherein R represents a member of the group consisting of a bond between aromatic carbon atoms and a divalent connecting radical and R' represents a member of the group consisting of sulfone, carbonyl, vinyl, sulfoxide, azo, saturated fluorocarbons, organic phosphine oxide and ethylidene groups and Y and $Y_1$ each represent inert substituent groups selected from the group consisting of halogen, alkyl groups having from one to four carbon atoms and alkoxy groups having from one to four carbon atoms and where $r$ and $z$ are integers having a value from 0 to 4 inclusive.

11. The thermoplastic defined in claim 9 wherein said polyarylene polyether is composed of recurring units having the formula:

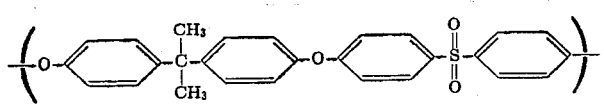

12. The thermoplastic defined in claim 9 wherein said polyarylene polyether is composed of recurring units having the formula:

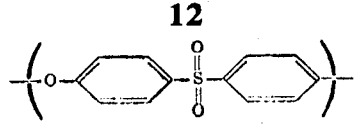

13. The process of claim 1 wherein a thermoplastic employed is a polycarbonate composed of recurring units having the formula:

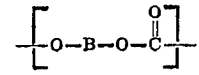

wherein B is a divalent aromatic radical of a dihydric phenol.

14. The process of claim 1 wherein a thermoplastic employed polyhydroxyethers composed of recurring units having the formula:

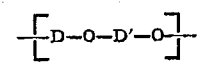

wherein D is the radical residuum of a dihydric phenol, and D' is a hydroxyl containing radical residuum of an epoxide.

* * * * *

UNITED STATES PATENT OFFICE
CERTIFICATE OF CORRECTION

Patent No. 3,760,055      Dated September 18, 1973

Inventor(s) John B. Wheeler III, John Sonia, Thomas E. Hayes and Robert P. Petrochko It is certified that error appears in the above-identified patent and that said Letters Patent are hereby corrected as shown below:

Page 1, containing Inventors' names, col. 1, line 2, "Wheelen, III et al." should read --Wheeler, III et al.--

Page 1, containing Inventors' names, col. 1, line 5, "John B. Wheelen, III" should read --John B. Wheeler, III--.

Col. 5, line 61, "abour" should read --about--.

Col. 8, line 28, "wishes" should read --inches--.

Col. 9, line 16, "dispersed" should read --5--.

Col. 9, line 29, "ispersed" should read --dispersed--.

Col. 9, line 31, "7.16" should read --7/16--.

Col. 9, line 63, "wa" should read --was--.

Col. 10, line 25, "become" should read --becomes--.

Signed and sealed this 25th day of December 1973.

(SEAL)
Attest:

EDWARD M. FLETCHER, JR.
Attesting Officer

RENE D. TEGTMEYER
Acting Commissioner of Patents